United States Patent [19]

Klemm

[11] Patent Number: 4,640,533
[45] Date of Patent: Feb. 3, 1987

[54] ADJUSTABLE PIPE EXTENDER FOR HIGH PRESSURE LINES CARRYING ABRASIVE MATERIALS

[75] Inventor: Robert E. Klemm, Milwaukee, Wis.

[73] Assignee: Construction Forms, Inc., Cedarburg, Wis.

[21] Appl. No.: 784,798

[22] Filed: Oct. 4, 1985

[51] Int. Cl.⁴ .............................................. F16Z 27/12
[52] U.S. Cl. ...................................... 285/62; 285/298; 285/415; 285/420; 285/165; 403/109; 239/165; 137/615
[58] Field of Search ................... 285/62, 298, 414, 415, 285/420, 165, 170, 411, 337, 324; 403/109, 344; 417/900; 239/165; 137/615

[56] References Cited
U.S. PATENT DOCUMENTS

| | | | |
|---|---|---|---|
| 324,154 | 8/1885 | Pare et al. | 285/298 |
| 957,845 | 5/1910 | Brinley et al. | 403/344 |
| 2,472,307 | 6/1949 | Nagel | 285/415 |
| 2,937,038 | 4/1956 | Gondek | 285/414 |
| 3,572,380 | 3/1971 | Jackson et al. | 137/615 |
| 3,675,721 | 7/1972 | Davidson et al. | 239/165 |
| 3,685,543 | 8/1972 | Schwing et al. | 137/615 |
| 3,707,990 | 1/1973 | Schaible et al. | 137/615 |
| 3,860,175 | 2/1975 | Westerlund et al. | 239/165 |
| 3,918,749 | 11/1975 | Taylor | 285/256 |
| 4,418,713 | 12/1983 | Schlecht | 137/615 |

Primary Examiner—Cornelius J. Husar
Assistant Examiner—Eric K. Nicholson
Attorney, Agent, or Firm—Andrus, Sceales, Starke & Sawall

[57] ABSTRACT

A concrete pumping system includes a pipe extender unit for adjustment of a pipe length between two fixed points. The extender unit includes a ductile steel pipe telescoped over a standard pipe, with a seal therebetween. Four jaws of hardened steel have inner teeth on the center portion only which abut the exterior of the pipe section. The pipe and jaws have end exterior shoulders. A two-piece annular clamp has spaced clamping legs engaging the shoulders to connect the members and force the jaw teeth into the outer wall of the pipe section to affix the pipe extender to the pipe section thereof. The teeth have a radial side and an inclined side joined by an outer flat land.

21 Claims, 6 Drawing Figures

U.S. Patent  Feb. 3, 1987  4,640,533
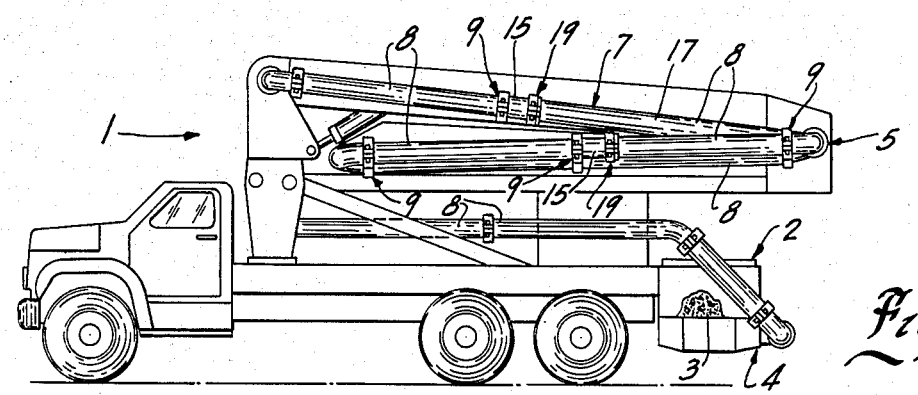
Fig. 1
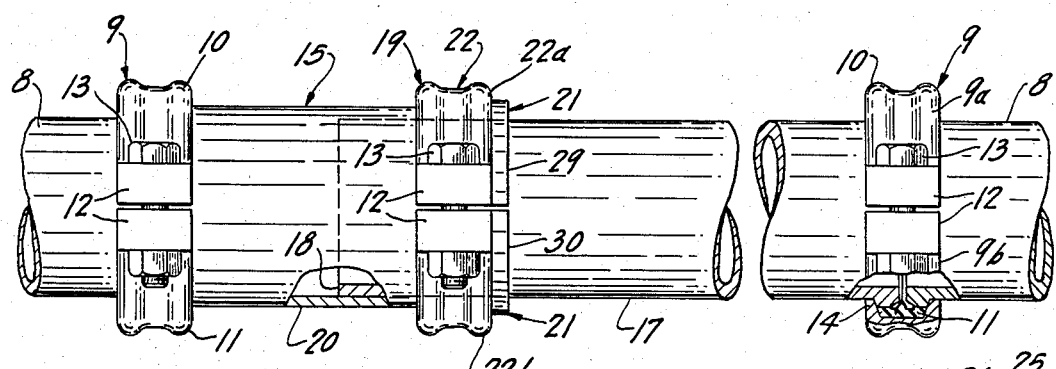
Fig. 2
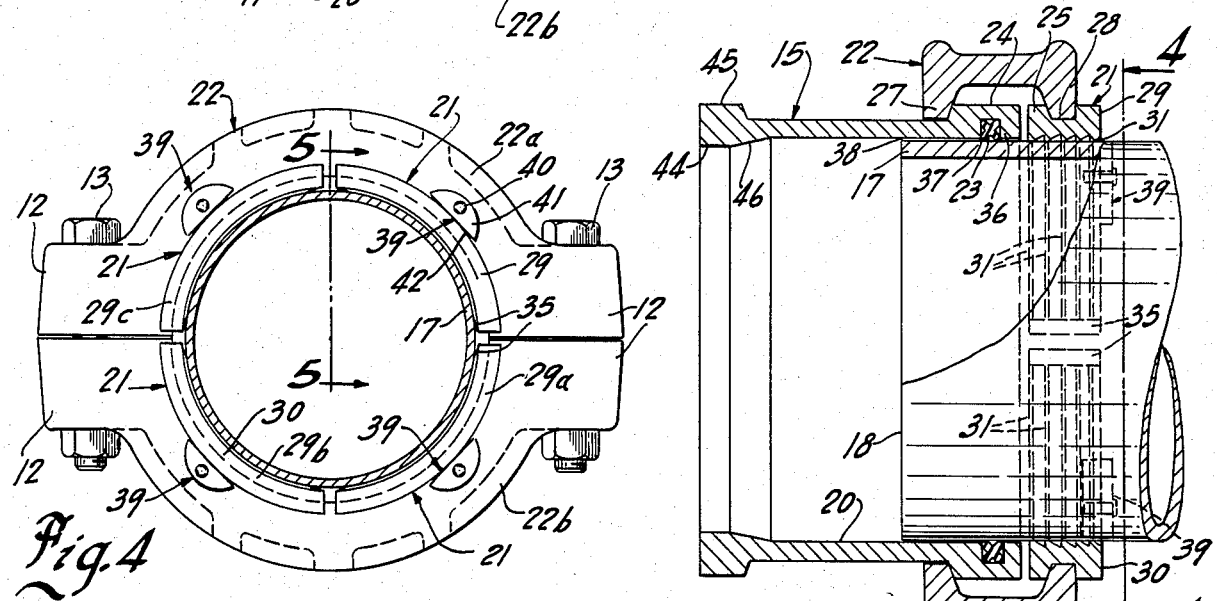
Fig. 3
Fig. 4
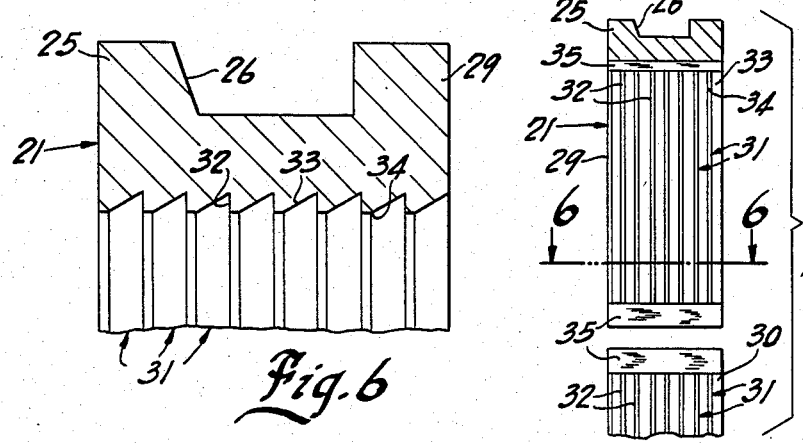
Fig. 5
Fig. 6

ADJUSTABLE PIPE EXTENDER FOR HIGH PRESSURE LINES CARRYING ABRASIVE MATERIALS

BACKGROUND OF THE INVENTION

This invention relates to an adjustable pipe extender for high pressure pumping lines for pumping of abrasive materials and particulary concrete and the like.

The concrete pumping industry has developed a standard length pipe section for the assembly of concrete pumping distribution lines. Such pipe sections are formed with the necessary formed end shoulders defining outwardly projecting members for interconnection with standard releasable couplings. Concrete pumping is a very high pressure environment. Pressures of two to three thousand PSI and even higher transient pressures may be encountered. Concrete pumping is also a very harsh environment. The system operates in an environment including airborne foreign matter and the concrete itself is a very abrasive and damaging material. The couplings must therefore be designed to operate as high pressure couplings which can be opened and closed with the desired firm interconnection of the pipe in the presence of concrete and other foreign matter.

In the construction of concrete pumping apparatus and systems, various fixed connecting locations are encountered. Although the apparatus and system design is perferably made to accommodate standard lengths of pipe used in concrete pumping line, small variations in the connection locations are often encountered. Generally, minimal sized variations have been accomodated by the use of shimms located within the joint structures. However, larger variations in the distance between coupling locations require custom built connectors. Further, shimms and like coupling modification often result in a faulty connection. For example, closing of the clamp assembly on the shimmed pipe end may prevent establishing a complete closure with the necessary firm reliable connection to hold transient pressures. A less than fully closed clamp connection is subject to opening and particularly in the presence of high transient pressures such as encountered in concrete pumping systems. Further, such connections may tend to allow undesirable leaking of the pumped concrete.

A practical application in automated concrete pumping systems is encountered in a mobile pump unit provided with an adjustable boom structure for distributing of the concrete within an expanded area adjacent the location of the mobile unit. Mobile pumping units for example are shown in U.S. Pat. No. 3,860,175 which issued on Jan. 14, 1975 and U.S. Pat. No. 3,918,749 which issued Nov. 11, 1975. Mobile units generally include various connecting pipes including vertical and horizontal disposed pipes connecting a supply hopper to a concrete distribution line. An extendable multi-section boom structure is mounted for extension of the pipe line system and particularly the discharge pipe at the drop location within specific distances of the mobile unit. The vertical and horizontal pipes are interconnected with appropriately located coupling units to permit location and orientation of the boom for proper location of the discharge end of the pipe.

In the construction of mobile boom mounted pumping systems, various collapsible folding boom designs are used including folding boom sections for supporting of the pipe line. Generally, fixed pipe elbows interconnecting are provided at the pivot points of the boom structure to couple the pipe sections on the adjacent boom sections. Such pivot points are of course fixed by the boom design. In the design of such systems, variation in the location of the several interconnecting pipe line swivel joints and couplings which are fixed by the boom construction often occur. Further, manufacturing tolerances often may require adjustment or compensation to adjust for the particular location of the joint and coupling. The manufacturers of such equipment prefers use of standard pipe sections, but other design requirements may demand use of special pipe to accommodate variations in the coupling locations.

For example, concrete pumping pipe sections normally are of a fixed length and typically in the United States are formed as 10 foot pipe. The distance between fixed points in a line may not be that accurately formed. Thus, in construction of boom-mounted pumping lines, the manufacturing tolerances and differences in construction of different models may result in significant variation in the necessary pipe length required to complete the pumping line. Rather than custom building a special section, the builder will, if possible, use shimms to compensate for any variation between the standard 10 foot lengths of pipe. If shimms cannot be used, a special pipe section is built for each truck. Replacement of course is difficult because each truck may require a special length. A further similar application is encountered in pumping of concrete in high rise structures. In construction of high rise structures such as buildings and other high rise structures, the concrete may be conveniently pumped to a vertical level and then laterally through the distribution pipe line portion. In such systems, a vertically oriented pipe line system is assembled on site by interconnecting of pipe sections. The pipe sections are mounted in stack relation and interconnected with suitable quick release couplings as needed to reach a particular level, with additions of vertical sections as needed. The tolerances in the building structures may result in a variance of a couple of inches at any given floor and require use of a special pipe length to properly locate the horizontal distribution line. In such systems, it is also often necessary to clean out the lines, which may require removal of one pipe section. If a lower one of a plurality of vertically oriented pipe sections is removed, the total line may shift downwardly a very sight amount. Any such variance however will make it extremely difficult, if not impossible, to reinsert the removed pipe section. To modify and build a custom pipe section would not only delay the process but would be extremely costly. An adjustable pipe section is therefore highly desirable in such an application.

In summary, the use of shimms and the like reduce the effectiveness of the coupling of the connections. In such constructions, leakage may occur and difficulty in movement of the connection may also be encountered.

The difficulty and problems associated with the providing of a high quality and reliable line connection has created a demand for an adjustable pipe section which can be readily used at minimal cost.

SUMMARY OF THE PRESENT INVENTION

The present invention is particularly directed to an adjustable pipe coupler extender apparatus for high pressure application which permit limited adjustment in the effective length of a connecting pipe section. The user can then use a pipe section with the adjustable coupling extender apparatus of the present invention affixed to the free end of the pipe section. Generally, the extender apparatus includes an adjustable coupling pipe which is extended outwardly to the proper length. The coupling pipe is locked in place and firmly affixed to the pipe section through a unique quick release connector which uses a releasable coupling means, such as the various coupling means presently in use.

In accordance with the present invention, a special adjustable coupling assembly is releasably telescoped to the end of a pipe section which may be a modified standard pipe section to permit limited adjustment in the length of the pipe section and thereby readily accomodate lengthening or shortening of the pipe section or sections interconnected between two fixed connection points. The extender apparatus includes a tubular pipe section having an inner diameter slightly greater than the outer diameter of a standard pipe section. Generally in a preferred embodiment of the invention, the adjustable extender apparatus includes an extender pipe telescoped over a standard pipe section with an encircling seal means interposed therebetween. Two or more curved jaw members, and preferably four, are located adjacent the telescoped end of the extender pipe and abutt the exterior periphery of the pipe section. The pipe extender and the jaws are formed with peripheral end clamping enlargements or shoulders which project outwardly and preferably have inclined clamping end walls. A releasable annular clamp, preferably of the standard construction, has a U-shaped cross-section defining spaced clamping legs or lips. The standard U-shaped clamp unit may have its clamping lips specially machined to mate with the corresponding shaped enlargements on the pipe extender and the jaws. When the clamp members are tightened down, the jaws are forced onto the pipe section and simultaneously affixed to the pipe extender such as to rigidly affix the clamp members onto the aligned pipe section and form an essentially rigid extension of the pipe sections. The jaws are formed with circumferentially extending teeth. The teeth are adapted to deform the outer surface and tightly grasp the ductile steel pipe section and form a firm rigid interconnection thereto. The teeth are preferably formed with a radial side and an inclined side joined by an outer flat land. The radial side faces the adjacent outer end of the pipe section. In the assembly, it is merely necessary to attach the adjustable pipe extender to the standard or special pipe section at the proper location to match the spacement between the pipe couplings.

The present invention has been found to provide a reliable and relatively low cost pipe extender apparatus suitable for high pressure applications in adverse environments such as concrete pumping line.

BRIEF DESCRIPTION OF THE DRAWING

The drawing furnished herewith illustrates a preferred construction of the present invention in which the above advantages and features are clearly illustrated as well as others.

In the drawing:

FIG. 1 is a simplified illustration of a mobile concrete placement unit incorporating a pipe extender unit constructed in accordance with the teaching of this invention;

FIG. 2 is an enlarged partial view of a line section including a new pipe extender unit shown in FIG. 1;

FIG. 3 is an enlarged longitundinal cross-sectional view of the extender unit shown in FIG. 2; and FIG. 4 is a transverse vertical section taken generally on line 4—4 of FIG. 3;

FIG. 5 is an enlarged elevational view of an extender pipe jaw alone, as generally viewed on line 5—5 of FIG. 4; and FIG. 6 is a further enlarged sectional view of the extender unit jaw taken generally on line 6—6 of FIG. 5.

DESCRIPTION OF ILLUSTRATED EMBODIMENT

Referring to the drawing and particularly to FIG. 1, a mobile concrete placement unit 1 is shown in a location for distributing of concrete within a given surrounding area. The mobile placement unit includes a supply hopper 2 within which readi-mix concrete 3 is held. A concrete pump assembly 4 on unit 1 draws the concrete 3 from the hopper 2 and discharges it through a distributing line system 5 and to a discharge nozzle, not shown. The discharge line system 5 includes an extensible boom 7 which has pivoted sections for folding of the boom and line during transport. A pipe line distribution system is formed by a plurality of pipe sections 8 connected to the discharge end of the concrete pump assembly 4 and supported on the several boom sections. The several pipe sections 8 are coupled to each other through releasably couplings 9 to permit replacement of the pipe sections and include swivel end sections to accommodate the movement of the boom sections.

In assembly, care must be taken to establish a reliable connection at each coupling in the high pressure applications contemplated for the present invention such as pumping of concrete, fire proofing materials and the like. Concrete is a highly abrasive material and the pipe may also be periodically replaced. Various releasably couplings 9 are readily available in the art. Generally, the couplings 9, as shown in FIG. 2, include two semicircular members 9a and 9b, each having a U-shaped cross-section and adapted to encircle the pipe ends at the connecting locations. The pipe ends are provided with appropriate annular enlargements or shoulders 10 which mate with the recess of the U-shaped configured clamp members 9a–9b. A gasket 11 is generally located between the pipe ends and within the U-shaped clamp members to seal the joint between the pipe connections upon firm interconnection of the two clamp members. In the illustrated embodiment of the invention, the coupling 9 is shown as a typical standard 2-bolt coupling in which the clamp members 9a and 9b are shown with apertured bolt ears 12. Upon assembly, the aperatured ears 12 are align and clamping bolts 13 pass through the openings. When the bolts 13 are drawn up, the members 9a–9b and particular the side leg or lips 14, defined by the U-shaped configuration tighten onto the pipe shoulders 10 to quickly establish a rigid, reliable high pressure joint at the interconnection of the pipe sections 8.

The basic pipe section 8 may, for example, be an industry standard 5 or 6 inch diameter pipe section. The pipe is formed of a suitable heavy guage metal such as on the order of a #7 guage ductile steel to produce a rigid effective long life pipe section. In certain areas, the standard pipe sections 8 may not span the precise length between the connecting end couplers 9 for connection at the boom pivot joints. A special adjustable pipe extender unit 15, particularly forming the subject matter of this invention, is secured to the one pipe section of a standard construction and permits closing of the spacing between the spaced sections 8 while maintaining an effective releasably connection. The boom assembly which is one application in the present invention may of course be of any suitable construction, and no further description thereof is given other than as necessary to describe the present invention.

Referring particularly to FIGS. 2 and 3, the one pipe section 17 coupled to extender 15 is shown with the coupling end removed to define a simple cutoff end 18. The pipe end 18 is spaced from the adjacent fixed standard pipe section 8 by some limited fixed adjustment, such as typically two inches. The gap may of course be of any length but as a practical matter will usually be rather short. The gap or spacement is adapted to be spanned by the special adjustable extender unit 15 which is specially constructed in accordance with the present invention to establish a rigid joint between the pipe sections 8 and 17. In particular, pipe extender unit 15 is releasably affixed to the standard pipe section 17 and extends axially therefrom to close gap therebetween. The outer end of extender unit 15 is releasably secured to the adjacent pipe section 8 by a standard releasable coupler 9.

Generally, as shown more clearly in FIGS. 3-5, the special adjustable extender unit 15 is a multiple component assembly consisting of an adaptor or extender pipe 20, an annular hardened jaw unit 21 and a releasable encircling clamp unit or coupler 22 coupling the extender pipe 20 and jaw unit 21 to each other and to the modified pipe section 17. The jaw unit 21 is preferably formed of a hardened metal such as hardened steel.

Referring to FIG. 3, the extender pipe 20 has an internal diameter slightly larger than the external diameter of the basic concrete pumping pipe sections 8 and 17 and is adapted to be telescoped over the free or cutoff end 18 of section 17. An internal sliding seal 23 is disposed between the extender pipe 20 and the outer end of the modified standard concrete pumping pipe 17 to establish a reliable high pressure joint. The hardened jaw unit 21 is assembled over the pipe 17 in close spaced relation to the telescope end of the adapter or extender pipe 20. The adjacent end of the extender pipe 20 and the hardened jaw unit 21 are each specially formed to include similar outwardly projecting shoulders 24 and 25 which in the assembled relation are spaced generally in accordance with the spacing of the side lips 14 of a standard coupler 9.

Coupler 22 which is shown formed from a standard 2-bolt coupler used in the concrete pumping art, connects the pipe extender 15 to the jaws unit 21. Thus, the coupler 22 has a two identical semi-circular clamp member 22a-22b forming an annular encircling clamp. Each clamp member of coupler 22 has a U-shaped cross section defining clamping lips 27 and 28 to the opposite side thereof. The inner surfaces of each lip 27 and 28 is also similarly inclined slightly to complement the shape of the shoulders 24-25, such as the incline surface 26 of shoulder 25 as shown, in FIG. 6.

The two-bolt construction permits convenient and rapid connection of the extension to the basic pipe sections and thereby permits the use of the conventional pipe sections in the assembly of concrete pumping apparatus and lines. Upon assembly, the coupler 22 engages and tightens the jaw unit 21 onto the modified pipe section 17 thereby establishing a rigid and firm interconnection to the pipe section. The clamp members of coupler 22 also clamp onto the shoulder 24 of extender pipe 20 and form a rigid connection thereto and thereby forms a rigid interconnection between the extender pipe 20 and the pipe section 17.

More particulary in the illustrated embodiment of the invention, the hardened jaw unit 21 is shown including four identical substantially quarter section jaws 29, 29a, 29b, and 29c. Each of the jaws 29, 29a, 29b and 29c has a circumferential length which is slightly less than 90 degrees and an internal radius approximately corresponding to the external radius of the standard pipe section 8 and 17. The internal periphery of each jaw is similarly formed with a similar plurality of closely spaced and circumferentially extended teeth 31 over the internal circumference of the jaw. Each jaw for example may be formed with approximately 8 teeth axial per inch. Although not critical, the teeth 31 are preferably formed, as shown most clearly in FIGS. 3, 5 and 6, with a radial surface 32 facing the outer end of the concrete pipe section 17 and an inclined tooth surface 33 facing towards the body of the pipe section 17. The inner end of the teeth 31 are similarly formed with a short flat surface or land 34. For example, in a practical application having 8 teeth per inch, a land of approximately 0.030 inches has been found to provide a particularly satisfactory construction for firm gripping of a standard #7 guage steel pipe.

As shown most clearly in FIGS. 4 and 5, the internal end portions of each jaw have the teeth 31 removed essentially to the base portion of the tooth, as at 35. For example, a length of ¾ inch may be ground off, with an inclined grind, having a maximum grind at the very edge or end of the jaw. The ground end portions 35 insures a firm forcing of the internal portion of each pipe jaw onto the concrete pipe section 17 to establish the necessary firm and rigid interconnection desired. Thus, if the jaw sections are formed with teeth to the very end of the jaw, the sharp ends may tend to catch on the pipe surface and interfere with proper assembly of the coupling.

The exterior surface of each jaw 29-29c is formed with a clamping groove defining the shoulder 25 and adapted to receive the clamping lip or leg 28 of the coupler 22.

With the pipe section 17 and extender pipe 20 and the clamping jaws 29-29c appropriately located, the clamp legs 27-28 of coupler 26 engage the clamping shoulders 25 and 24 of the jaws 29-29c and of the extender pipe 20 such that the drawing-up of the two bolt unit firmly interengages with the several clamping walls to establish a high pressure and firm connection of the extender pipe to the standard pipe section. The groove, for example in a practical application, may be formed with a depth of approximately 0.196 inches and a length of approximately 0.45 inches. The illustrated conventional configuration may of course be changed if some special specification is necessary or desired. In any event, the clamp unit is to be formed to provide the desired high pressure connection necessary in the concrete pumping system.

The adapter or extender pipe 20 is formed of a standard metal such as the #7 guage used for the standard pipe section 15. Typically, a basic 4½ inch adapter pipe length provides for essentially all normal adjustment requirements encountered in concrete pumping systems.

The extender pipe 20 is formed with the clamping shoulder 27 having the outer inclined clamping wall. As illustrated, the shoulder 24 has an axial length somewhat greater than that of the corresponding clamp shoulder 25 on the hardened jaw. The inner edge of the shoulder has the inclined clamping surface integrally formed thereon.

The inner face or periphery of the pipe extender 20 in alignment with the clamping shoulder 24 and spaced slightly from the telescoped end of the pipe section is formed with an internal seal recess 36. A high pressure encircling ring seal 23 is located within the recess. In the assembled relation, the ring seal 23 is compressed between the recess and the telescoped pipe section 17 to establish a firm seal which essentially eliminates leakage at the coupling. Although the annular seal 23 may be of any desired construction, a preferred construction consist of a cross shaped flexible seal member having a substantially square outer peripheral configuration and within the recess with the various lips of the seal engaging the pipe section 15 and the walls of the recess 36. The pumped concrete which might move into and through gap 38 between the extender pipe 20 and the pipe section 17 and into engagement with the seal will tend to force the seal structure into firm sealing engagement with the respective surfaces to maintain the desired fluid joint.

In the assembled relation, the extender pipe 20 is pressed or forced over the surface of the modified standard pipe or other suitable pipe to form an extension from the pipe section, with the outer coupling end located in the desired predetermined relation to the adjacent fixed pipe section 8 for receiving of the releasable coupling 22 which firmly interconnects the jaws to the standard pipe and the extender pipe and to the jaw members to form the rigid interconnection therebetween.

The coupler unit 22 is preferably locked in place after establishing the high pressure interconnection. The coupler unit 22 is shown having an interfering lock assembly 39 attached each of its clamp members and gripping the corresponding aligned jaws 29-29c. The additional locking, or some other type of fixed releasable interconnection, is desired to further increase the reliability and life of the pipe connection when applied in the pressure application such as the concrete pumping system. The lock assemblies 39 are similarly constructed and reference is made to the upper unit 39 shown in FIG. 4.

Referring particularly to FIG. 4, the lock assembly 39 includes a roll pin 40 driven into an opening or otherwise secured, to the outer face of the clamping lip 28 of the clamping member adjacent to the jaw 29. A small semi-circular lock member 41 is fitted onto the roll pin 40. The lock member 41 has a flat wall 42 engaging the adjacent exterior peripheral surface of the outer projection or shoulder 25 on the jaw 29. The lock assemblies 39 significantly ease the assembly of the jaws and coupling to the pipe section and insure a proper orientation of the jaw on the pipe section. Although not necessary the lock member 41 also contributes to the firm frictional interengagement with the jaw 29 to thereby essentially lock the jaw 29 and the clamp member into a firm and reliable interconnection.

The outermost end of the extender pipe 20 is formed with the pipe coupling end, as shown in FIG. 3. The end is shown formed as an enlarged end having a radial inner and outer projections 44 and 45. The inner projection 44 has a diameter, essentially corresponding to the internal diameter of the standard pipe section 8 or 17. The projection 44 is coupled to the body of the extender pipe 20 by a smooth inclined wall 46 to provide a relatively smooth transition between the internal diameter of the extender pipe and the internal diameter of the standard pipe section to which it is secured. The exterior projection 45 is a solid, integral formation defining a standard shoulder having the inner wall formed to as an inclined clamping wall of a standard angle of incline. The extender pipe 20 end is thus adapted to be located immediately adjacent to the corresponding standard pipe section 8 and interconnected thereto as by a conventional coupling unit 9.

The present invention provides a relatively simple pipe coupler extender apparatus permitting limited adjustment in the length of the standard pipe section. The adjustable unit is conveniently and readily connected to the standard pipe and to the adjacent coupling in accordance with substantially conventional procedures. The adjustable extender uses standard, well known materials presently in use in concrete systems and will be readily understood and applied by those in the field.

Various modes of carrying out the invention are contemplated as being within the scope of the following claims particularly pointing out and distinctly claiming the subject matter which is regarded as the invention.

I claim:

1. In a concrete pumping system, comprising a plurality of essentially identical line pipe sections mounted in aligned end to end relationship, each of said pipe sections being of a standard length and having annular clamping shoulder portions, coupling units for firmly connecting adjacent pipe sections, said system including at least one pair of coupling locations spaced from each other by a distance less than said standard length, a special pipe section interposed between said locations and having a clamping shoulder portion on only one end thereof for coupling to an adjacent line pipe section, a high pressure pipe extender unit coupled to said special pipe section for adjusting the length of said special pipe section to close said space between said locations, said special pipe section having a constant diameter free end, said extender unit comprising an extender pipe telescoped over the free end of said special pipe section and thereby forming an extension thereof, sealing means interposed being the opposed peripheral surfaces of said extender pipe and said special pipe section, a plurality of arcuate jaw members circumferentially distributed about said special pipe section immediately adjacent the telescoped end of said special pipe, said extender pipe and said jaw members including circumferential shoulder projections, a multiple-piece annular coupling means encircling said adjacent shoulders of said extender pipe and said jaw members for clamping the jaw members to said special pipe section and for interconnecting of said pipe extender to said pipe jaws and thereby firmly affixing said extender pipe to said special pipe section and forming a rigid extension thereof, and a coupling unit of said spaced coupling units connecting said clamping shoulder portion of said special pipe section to said adjacent line pipe section.

2. The apparatus of claim 1 wherein said extender pipe is formed of ductile steel, said clamp member being formed of a cast metal and said jaws being formed of a hardened steel.

3. The concrete pumping system of claim 1 wherein said plurality of arcuate shaped jaws are formed of a hardened metal and adapted to be circumferentially aligned and located in encircling relation, the inner periphery of said jaw having a plurality of axially distributed teeth adapted to be forced into gripping engagement with telescoped special pipe section.

4. The concrete pumping system of claim 3 wherein four of said jaws are provided and each is slightly less than 90 degrees in length, the inner periphery of each of said jaws being flared outwardly on the end portions to space the end portions from the special pipe section.

5. The system of claim 3 wherein said teeth are formed with a substantially radial wall and a second axial spaced inclined wall, said radial wall and a said inclined wall being interconnected by a flat outer land.

6. The system of claim 1 wherein said jaws are formed with a plurality of circumferential teeth, said teeth extending throughout the circumferential center portion of the jaws and being spaced from the ends of the jaw and connected thereto by outwardly inclined surfaces.

7. The system of claim 1 including locking means interconnecting each of said jaw members to the adjacent coupler to prevent relative movement therebetween.

8. The concrete pumping system of claim 1 wherein said jaws include an outer clamping enlargement having a central recess having an inner base and defining a pair of spaced clamping shoulders, the base of said recess being located radially outwardly of said special pipe section, an annular coupling means including a plurality of arcuate clamp members adapted to be arranged in an encircling clamping ring, each of said clamp members having a substantially U-shaped configuration defining side clamping legs adapted to operatively engage said connecting shoulders of said adjacent jaws and said extender pipe.

9. The system of claim 1 wherein said jaws are a hardened steel, said line pipe sections and said special pipe section are a ductile steel, said jaws are formed with a plurality of circumferential teeth, said teeth extending throughout the circumferential center portion of the jaws and being spaced from the ends of the jaw and connected thereto by outwardly inclined surfaces, said teeth each having a substantially radial wall and a second axial spaced inclined wall, said radial wall and a said inclined wall being interconnected by a flat outer land.

10. The system of claim 9 having a locking means interconnecting each of said jaw members to the adjacent coupler to prevent relative movement therebetween.

11. An adjustable pipe extender apparatus for connection to a pipe section to extend the length thereof and for releasable coupling the pipe section in a high pressure pumping system, comprising an extender pipe having a releasable coupling end for telescoping over and being releasably joined to a telescoped pipe section by an encircling U-shaped clamp assembly, an annular jaw unit consisting of a plurality of arcuate shaped jaws adapted to be circumferentially aligned and located in encircling relation to said telescoped pipe section, and a coupling means forming an encircling unitary integrated clamp assembly for interconnecting of said jaws and said extender pipe and simultaneously forcing said jaws into firm clamping engagement with said telescoped pipe section for rigidly and firmly interconnecting of said jaws to said pipe extender and thereby said extender pipe to said telescoped pipe section.

12. The apparatus of claim 11 wherein the inner periphery of said jaw having a plurality of axially distributed teeth movable into gripping engagement with the telescoped pipe section, the outer periphery of said jaws being formed with a clamping shoulder, said coupling including an encircling multiple piece clamp assembly including arcuate clamping ring and moving said jaws with said teeth moving radially inwardly.

13. The apparatus of claim 11 wherein said extender pipe has a coupling end opposite said telescoped end, said coupling end having an external clamping shoulder and an inner shoulder having a diameter corresponding essentially to the internal diameter of said telescoped pipe section, the internal diameter of said extender pipe between said inner shoulder and said telescoped end having an internal diameter slightly large than the external diameter of said telescoped pipe section.

14. The apparatus of claim 11 wherein said extender pipe is formed of ductile steel, said jaws being formed of a hardened steel and having teeth extending throughout the circumferential center portion of the jaws and being spaced from the ends of the jaw and connected thereto by offset surfaces.

15. The apparatus of claim 14 wherein said offset surface are inclined surfaces.

16. The apparatus of claim 14 wherein said teeth are formed with a substantially radial wall and a second axial spaced inclined wall, said radial wall and a said inclined wall being interconnected by a flat outer land.

17. The apparatus of claim 11 including a releasable locking means interconnecting each of said jaw members to the adjacent coupling means to restrict relative movement therebetween.

18. The apparatus of claim 17 wherein said locking means includes a cam member affixed to the side of the coupling means and located in frictional clamping engagement with the adjacent outer surface of the aligned jaw.

19. A high pressure pipe extender unit for coupling to a pipe section for adjusting the length of said pipe section, said last named pipe section having a constant diameter free end, comprising an extender pipe telescoped over the free end of said pipe section and thereby forming an extension thereof, a plurality of arcuate jaw members circumferentially distributed about said pipe section immediately adjacent the telescoped end of said extender pipe, said extender pipe and said jaw members including interconnecting circumferential shoulder projections, a multiple-piece annular encircling coupling means engaging said adjacent shoulders of said extender pipe and said jaw members for clamping the jaw members to said pipe section and for interconnecting of said pipe extender to said pipe jaws and thereby firmly affixing said extender pipe to said telescoped pipe section and forming a rigid extension thereof, and a releasable locking means interconnected to said coupling means and to said jaws for locking of said coupling means to said jaws.

20. The high pressure pipe extender of claim 19 wherein said jaw member have a shoulder portion located to the exterior of said coupling means, said coupling means having a body portion extending outwardly of said shoulder portion, and said locking means includes a cam member affixed to said body portion and located in clamping engagement with said shoulder portion.

21. An adjustable pipe extender for connection to a pipe section to extend the length thereof and for releasable coupling of the pipe section in a pumping system, comprising an extender pipe having a releasable coupling end for releasably connection to a corresponding end of a pipe section by an encircling clamped assembly, said coupling end having an internal diameter corresponding essentially to the internal diameter of said line pipe section, the internal diameter of said extender pipe expanding from said coupling end to the opposite end and to an internal diameter slightly larger than the external diameter of said pipe section, the opposite end of said extender pipe from said coupling end having a coupling shoulder, an annular jaw unit consisting of a plurality of arcuate shaped jaws formed of a hardened metal and circumferentially aligned and located in encircling relation about said coupling shoulder, the inner periphery of said jaw having a plurality of axially distributed teeth forced into gripping engagment with a pipe section.

* * * * *